Oct. 9, 1928.
F. C. WOODS
GAFF HOOK
Filed June 15, 1927
1,686,889
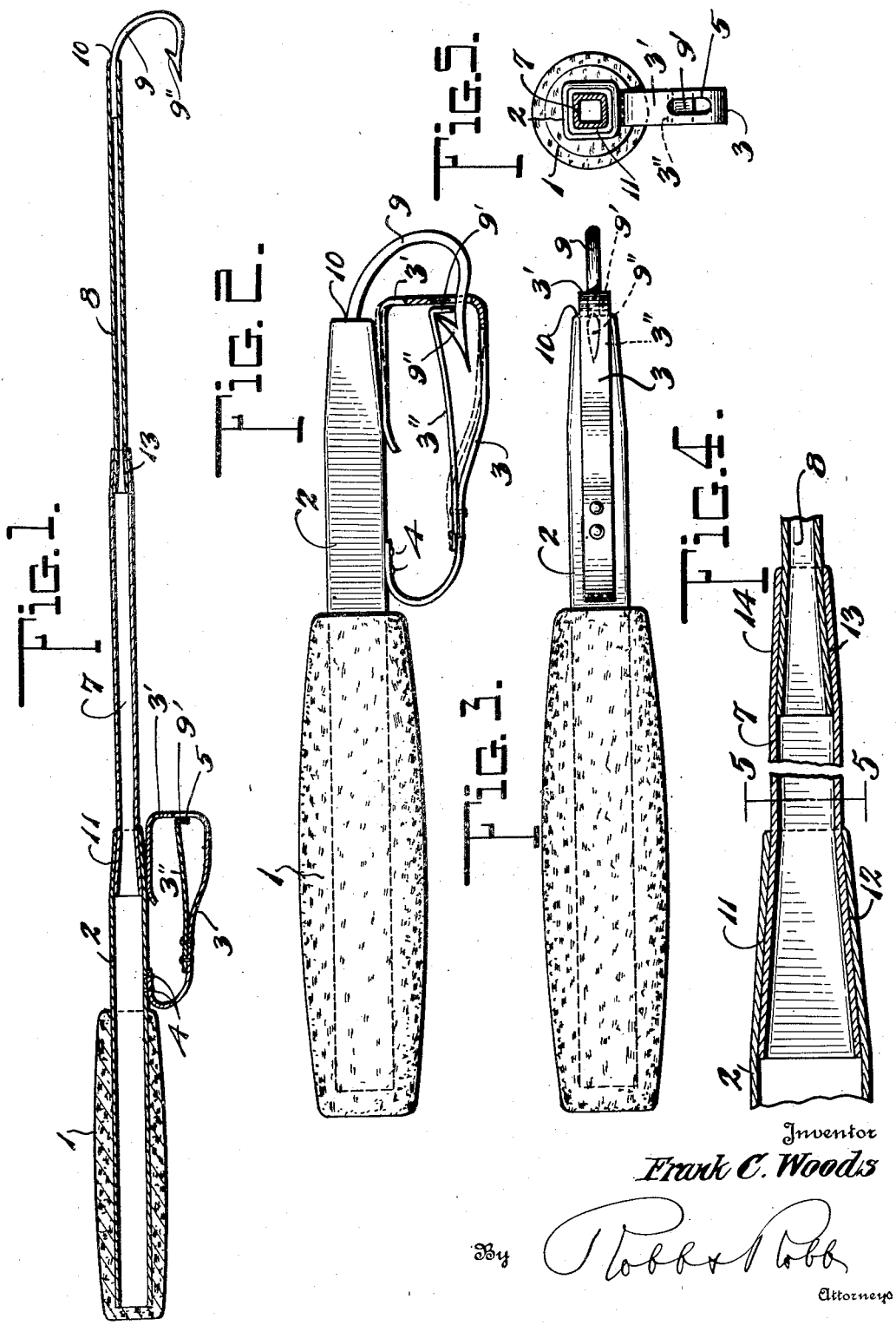
Inventor
Frank C. Woods
By Robb & Robb
Attorneys Patented Oct. 9, 1928.

1,686,889

UNITED STATES PATENT OFFICE.

FRANK C. WOODS, OF CLEVELAND, OHIO.

GAFF HOOK.

Application filed June 15, 1927. Serial No. 199,000.

This invention relates to improvements in apparatus for the landing of fish and the like, and more particularly to gaff hooks of the telescoping type.

An object in view is the retention of the structure in firm, rigid condition during use, while enabling the collapsing of the several sections with especial ease and facility immediately following the first telescoping movement.

A further object in view is the guarding of the barb and point of the hook when not in use by means effectively retaining the parts in a collapsed condition and at the same time permitting easy and ready extension thereof.

A further object is the maintenance of the hook in proper alinement with the keeper, both to facilitate assemblage and to facilitate manipulation when the hook is extended.

With these and other objects in view, as will in part hereinafter become apparent and in part be stated, the invention comprises certain novel constructions, combinations and arrangements of parts as subsequently specified and claimed.

In the accompanying drawings:

Figure 1 is a view in section of an apparatus embodying the features of the present invention.

Figure 2 is a similar view of the same with the parts collapsed, parts being broken away to show parts in the rear.

Figure 3 is a view similar to Figure 2 of the structure observed from a plane at right angles to the plane of observation of Figure 2.

Figure 4 is an enlarged, detailed, fragmentary, longitudinal section, especially disclosing the tapered joints.

Figure 5 is a cross section of one modification taken on the plane indicated by line 5—5 of Figure 4.

Referring to the drawings by numerals, 1 indicates any appropriate handle or grip which is tubular to receive section 2 of the improved gaff hook. Section 2 preferably extends substantially throughout the length of the handle or grip 1. At an appropriate distance beyond handle 1, a looped spring guard 3 is fixed at 4 to the section 2, and extends outwardly substantially to the end of the section 2 and is spaced therefrom and bent approximately at right angles to form a return section 3', apertured at 5, for the passage of the point of the hook hereinafter mentioned.

A keeper strip 3'' is fixed to the spring 3 at a point remote from the section 3' and extends to said section and is provided with the right angle keeper tab 9' located in the path of the barb of the hook, as hereinafter described.

Into the tubular section 2 is telescoped a tubular section 7, and into the tubular section 7 is telescoped a section 8, it being obvious, of course, that the various sections 2, 7 and 8 may be of any length preferred and otherwise dimensioned according to the service to be rendered. Also, any number of telescoping sections may be utilized. The outermost section, being section 8 in the illustrative embodiment seen in the drawing, rigidly carries a hook 9 having the usual penetrating point and the off standing barb 9'', similar to the conventional fishing hook. Since the device is intended to be constructed with facility, from the use of readily available material, the hook 9 may be an ordinary fish hook fixed within the section 8, and, being of less diameter, leaves the off-set 10, since the hook outstands laterally in the same direction from section 8 as does the keeper spring 3 from the section 2.

As best seen in Figure 4, each tubular section is of substantially uniform dimensions, except at its ends. The outer end of the section 2, that is the end remote from handle 1, is abruptly tapered, as indicated at 11, to correspond with an abrupt flare 12 at the inner end of section 7, and the outer end of section 7 is abruptly tapered at 13 to correspond with an abrupt flare 14 at the inner end of section 8. While, of course, the size and proportion of parts may be varied within any reasonable limits, an effective gaff hook may possess a shank made up of the several telescoping sections of approximately 18'' in length when fully extended, and in that case the grip or handle 1 will be approximately 1⅛'' thick at its thickest point, and the several abrupt tapers and flares 11, 12, 13 and 14 will each be approximately one-half inch long. These exact figures are given for purposes of illustration and are susceptible of a wide range of deviation.

It is desirable to have the hook 10 outstand at a relatively fixed angle and not to revolve, since the operator can utilize the same with greater facility if the hook remains constantly in one relative position and does not turn when the instrument is picked up, or when a landing stroke is being made. Also, it is desirable to have the hook outstand in the same direction as the location of the keeper 3, so that the point of the hook may pass through the opening 5 readily when the sections are collapsed to the position seen in Figure 2, without the necessity for special location of either of the parts relative to the other. To this end, means is preferably employed to prevent relative rotation of any of the sections 2, 7 and 8 with respect to any other. Such rotation preventing means may be any of several features of construction, one form being illustrated in Figure 5 and consisting of the formation of the several sections 2, 7 and 8 square in cross section.

In operation, the parts are extended as seen in Figure 1 when the instrument is to be used, as, for instance, when a fish is to be picked up from the side of a boat and lifted into the boat, and when not in use the parts are collapsed to the position seen in Figure 2. It is particularly to be noted that the abrupt or relatively abrupt tapers at 11, 12, 13 and 14 causes each section to be loose in its preceding section and to slide freely therein, except when in the outermost extended position where the tapers 11, 12, 13 and 14 effect a sufficient friction to keep the parts extended. As the hook is being brought to the collapsed position seen in Figure 2, its point enters the aperture 5 and its barb 9" strikes the keeper tab 9' edgewise of the barb, and causes the same to back off until the barb passes said keeper tab, whereupon the tab springs outward to the position seen in Figure 2. This effects a locking of the hook and connected parts in the closed or collapsed position, and also insures retention of the hook under the guard or keeper 3 so that it may not do any accidental damage. When it is desired to extend the hook again, the operator depresses the spring guard 3 at about the point of connection of the keeper strip 3", or even nearer the handle 1. Depression of the spring 3 toward the section 2 causes the keeper strip 3" to be sprung laterally and to move the keeper tab 9' out of the path of the barb 9", and thereupon the hook 9 may be readily drawn or flipped outward through the aperture 5 to the extended position.

Having thus described my invention, what I claim as new and desire to secure by Letters Patent is:

1. A gaff hook comprising collapsible, telescoping sections, each of substantially constant cross section throughout its length except at its ends, the telescoping ends of the several sections having relatively abrupt cooperating tapers and flares for effecting frictional retention of the sections in an extended condition while allowing easy and free sliding of the sections telescopically when such abrupt tapers are not in frictional engagement.

2. A gaff hook comprising telescoping sections, a guard carried by one of the sections, a hook carried by another of the sections and movable to and from a position in the guarded relation to said guard incident the telescoping action of the guards, and a spring keeper located in the path of the hook and adapted to be spring to and from position for retaining the hook in the guarded relation.

3. A gaff hook comprising telescoping sections, a hook carried by one end section and a looped spring guard carried by the other end section and having an aperture, in the path of movement of the hook when the sections are being collapsed, proportioned to permit passage of the hook into the said loop of said spring guard, and a keeper tab carried by said spring guard and movable to and from a position in the path of the barb of said hook.

4. A gaff hook comprising telescoping sections, a hook carried by one end section and a looped spring guard carried by the other end section and having an aperture, in the path of movement of the hook when the sections are being collapsed, proportioned to permit passage of the hook into the said loop of said spring guard, and a keeper strip extending along the spring guard and having a terminal portion located to be sprung into and out of the path of the barb of said hook.

5. A gaff hook comprising telescoping sections, a hook carried by one end section and a looped spring guard carried by the other end section and having an aperture, in the path of movement of the hook when the sections are being collapsed, proportioned to permit passage of the hook into the said loop of said spring guard, and a keeper strip extending along the spring guard and having a terminal portion located to be sprung into and out of the path of the barb of said hook, said keeper strip being located within the loop of said spring guard.

6. A gaff hook comprising telescoping sections, a hook carried by one of the sections, the sections being provided with means for preventing relative rotation, and a keeper outstanding from another one of the sections in the same direction as the outstanding of the hook for receiving the free end of the hook when the sections are collapsed, said keeper also constituting a guard for the hook when the sections are in a collapsed condition.

In testimony whereof I affix my signature.

FRANK C. WOODS.